United States Patent [19]

Emory

[11] 4,205,478
[45] Jun. 3, 1980

[54] MULTI-LINE FISHING ATTACHMENT

[75] Inventor: John E. Emory, Traverse, Mich.

[73] Assignee: Big Jon, Inc., Traverse City, Mich.

[21] Appl. No.: 971,736

[22] Filed: Dec. 21, 1978

[51] Int. Cl.² .............................................. A01K 91/04
[52] U.S. Cl. ................... 43/44.85; 43/44.88; 43/44.91; 43/44.95
[58] Field of Search ................. 43/43.12, 44.85, 44.87, 43/44.95, 44.84, 44.83, 42.49, 44.86, 44.91, 44.93, 44.92, 44.88, 42.04, 42.05; 24/136 R, 137 R, 136 L

[56] References Cited

U.S. PATENT DOCUMENTS

| | | | |
|---|---|---|---|
| 1,232,545 | 7/1917 | Hilsz | 43/44.85 |
| 2,609,634 | 9/1952 | Simpson | 43/44.88 |
| 2,786,296 | 3/1957 | Loebensteen . | |
| 2,842,888 | 7/1958 | Landrum | 43/44.95 |
| 2,908,989 | 10/1959 | Pouinelli . | |
| 3,672,087 | 6/1972 | Milburn . | |
| 3,688,431 | 9/1972 | Nichols . | |
| 3,703,047 | 11/1972 | Schenauer . | |
| 3,747,254 | 7/1973 | Caruso . | |
| 3,925,920 | 12/1975 | Walker | 43/43.12 |

Primary Examiner—Nicholas P. Godici
Attorney, Agent, or Firm—Price, Heneveld, Huizenga & Cooper

[57] ABSTRACT

A device for attaching a plurality of leaders to a single fishing line is disclosed. The device comprises a hollow, elongate, generally cylindrical body having axially opposed ends proximately and distally located with respect to the fishing line. An abutment is formed in the proximal end of the body. An axially displaceable clamping member is disposed within the body and a guide slot is formed in the proximal end of the body for guiding a fishing line between the abutment and the clamping member. The clamping member is spring biased toward the abutment into secure clamping engagement with a fishing line disposed therebetween. A stem disposed on the clamping member extends through the distal end of the body and includes means for securing a leader to the clamping member. When a fish strikes a lure disposed on the end of the leader, the drag of the fish pulls the clamping member away from the abutment, out of secure clamping engagement with the fish line to provide for relative movement between the body of the device and the fishing line received therein.

20 Claims, 4 Drawing Figures

MULTI-LINE FISHING ATTACHMENT

BACKGROUND OF THE INVENTION

The invention relates generally to multi-line fishing rigs and, in particular, is directed to an attachment for slip connecting a leader to a fishing line.

It is well known to troll for fish with the use of a downrigger for lowering the lure or bait to the depth at which the fish are located. A downrigger normally comprises a motorized or hand cranked reel for dispensing a relatively strong downrigger line such as a stranded metal wire. A relatively heavy downrigger weight is attached to the end of the wire and the fishing line is releasably secured to the downrigger weight or to the downrigger line disposed above the downrigger weight. The downrigger weight is then lowered over the side of the trolling boat to the desired depth. The lure and a length of the fishing line trails behind the downrigger weight and line at the desired depth. When a fish strikes the lure, the fishing line is released from the downrigger and the fish is played with a rod and reel in the normal fashion.

Quite frequently, it is desirable to troll with more than one lure on a single fishing line, the lures extending from leaders disposed at various depths on the fishing line. Various arrangements are found in the prior art for achieving this end. The simplest method of providing multiple lures involves tying various leaders to the fishing line at different depths. In another arrangement found in the prior art, each leader is tied to an apertured ring and the apertured ring is threaded on the fishing line. A knot in the fishing line then fixes the position of the apertured ring and the leader with respect to the fishing line. The principal problems with both of these prior art multi-line fishing rigs are inconvenience and improper action of the downrigger release when a fish strikes one of the multiple leaders tied or otherwise secured to the fishing line above the downrigger release mechanism.

Tied multiple line fishing rigs are often difficult and time consuming to prepare and are always an inconvenience. Since it is often desirable to switch back and forth from single line to multiple line fishing rigs according to fishing conditions, setting up multi-line fishing rigs can rapidly become an onerous task. With tied multi-line rigs, the leaders cannot actually be disposed at substantially different depths along the fishing line, since the fishing line can not be reeled in past the first leader and long distances between leaders materially hamper the ability to play and reel in the fish. On the other hand, closely spaced multiple leaders are much easier to tangle. Also, strikes on leaders disposed above the downrigger release generally do not properly actuate the downrigger release. This is because downrigger releases are sensitive to and release in response to changes in tension in the portion of the fishing line extending behind the downrigger release. A strike on a lure disposed above the downrigger release of course does not effect the tension on the line behind the downrigger release but rather increases the tension in the line extending between the downrigger release and the rod and reel. Since the downrigger release is relatively insensitive to this increase in tension, it often does not release when a strike occurs on one of the multiple leaders.

In the case of multiple leaders tied to apertured rings threaded on the fishing line, the inconvenience factor is also high since again, each multiple line fishing rig is a permanent set up wherein one or more apertured rings must be threaded on the fishing line to remain there until the line is cut and retied. Although relative movement between the apertured rings and the fishing line is possible during reeling in and playing of the fish, the problem of improper action of the downrigger line release is again presented.

SUMMARY OF THE INVENTION

These and other problems in the prior art are solved by provision of a multi-line fishing attachment for slip connecting a leader to a fishing line comprising a body for receiving a fishing line; an abutment carried by the body; and a movable clamping member disposed on the body, the clamping member being adapted for movement toward and away from the abutment. A guide means is provided for guiding the fishing line between the abutment and the clamping member. The clamping member is spring biased toward the abutment such that the fishing line may be securely clamped therebetween. When it becomes desirable to set up a multi-line fishing rig, the attachment is easily and simply connected to an existing fishing line by pulling the spring biased clamping member out of engagement with the abutment and inserting the fishing line in the line guide. Upon release, the spring biased clamping member automatically clamps the device to the fishing line at the position or depth at which the additional leader is desired. The attachment is normally clamped to the fishing line as the downrigger line and the fishing line are being initially paid out.

The attachment includes means for securing a leader to the clamping member whereby a fish strike on the leader extending from the clamping member pulls the clamping member away from the abutment an amount sufficient to provide for relative movement between the attachment and the fishing line. Thus, when a strike occurs on a leader disposed on the fishing line above the downrigger release, the attachment and leader slip downwardly to the downrigger release to quickly and effectively release the same. Further drag from the fish caught on the multiple leader causes the attachment to again move relative to the fishing line until the lure disposed on the end of the fishing line is reached. The fish may then be reeled and played in the normal manner without concern about tangling or fouling of the leaders.

In the case of a strike on the leader and lure extending from the very end of the fishing line, a release occurs in the normal fashion and the line is reeled in and the fish played until the attachment breaks the surface of the water, at which time the fisherman or a helper releases the attachment from the fishing line by pulling the spring biased clamping member away from the abutment and removing the fishing line from the line guide. The fish may then be reeled in and played in the normal fashion. Thus, the multi-line fishing attachment of the present invention provides for simple and almost instantaneous conversion of a single lure fishing line to a multiple line fishing rig without impairing the action of the downrigger release mechanism, materially effecting the reeling and playing of the fish, or substantially increasing the likelihood of a line tangle.

DESCRIPTION OF THE PREFERRED EMBODIMENTS

Figure 1:
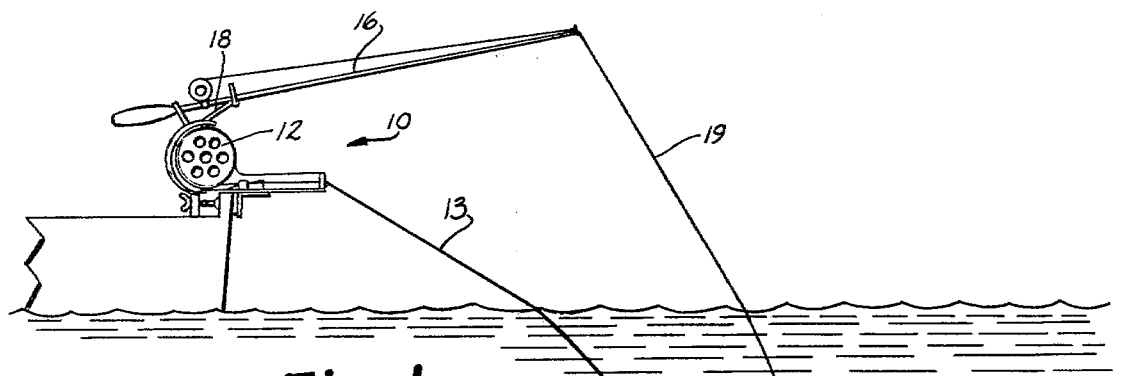
FIG. 1 is an elevational view of a downrigger and multiple line fishing rig employing the multi-line fishing attachment of the present invention.

Referring to FIG. 1, a deep trolling apparatus generally indicated by the numeral 10 is illustrated. The trolling apparatus 10 includes a motor or hand crank operated reel 12 for dispensing a relatively strong downrigger line 13 of stranded metal wire or the like. Disposed on the end of downrigger line 13 is a downrigger weight 15. A conventional fishing rod and reel 16 are mounted in rod holder 18. The fishing line 19 is releasably secured to the downrigger weight 15 by a downrigger release mechanism disposed at 20 on the downrigger weight 15. The downrigger release mechanism 20 may be of any conventional, commerically available type and thus is illustrated here only in schematic form.

A first lure 22 is disposed at the end of fishing line 19 on a leader 23 extending rearwardly from downrigger release 20. The depth of the first lure 22 is determined by the depth of downrigger weight 15 and the amount of stranded wire 13 dispensed from downrigger reel 12. Generally, downrigger reel 12 includes a foot indicator, or the like, to provide a constant readout of the depth of downrigger weight 15 and first lure 22.

A second lure 25 is trolled on a second leader or multiple leader 26 releasably secured at a predetermined position on fishing line 19 by the multi-line fishing attachment 30 of the present invention. The second lure 25 and second leader 26 are attached to fishing line 19 by simply clamping the attachment 30 to the line 19 at a predetermined position on the line 19 when the downrigger weight 15 and first lure 22 are being paid out.

Figure 2:
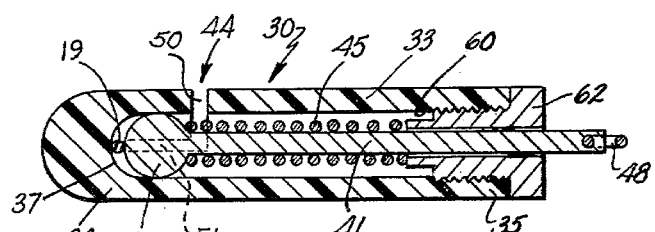
FIG. 2 is a fragmentary elevational view of another downrigger and multiple line fishing rig employing the multi-line fishing attachment of the present invention.

Referring now briefly to FIG. 2, the case where the downrigger release 20 is disposed on the downrigger line 13 rather than the downrigger weight 15 is illustrated. In this case, the downrigger weight is lowered over the side of the boat and the first lure 22 is attached to downrigger release 20 before the downrigger weight 15 is lowered to the desired depth. In this case, the meter or indicator on downrigger reel 12 will be calibrated to indicate the distance between the reel 12 and the release 20 on the downrigger line 13. As before, the second lure 25 and second leader 26 will be attached to the fishing line 19 at a predetermined position by clamping the attachment 30 thereto while the downrigger line 13 and fishing line 19 are being paid out.

Figure 3:
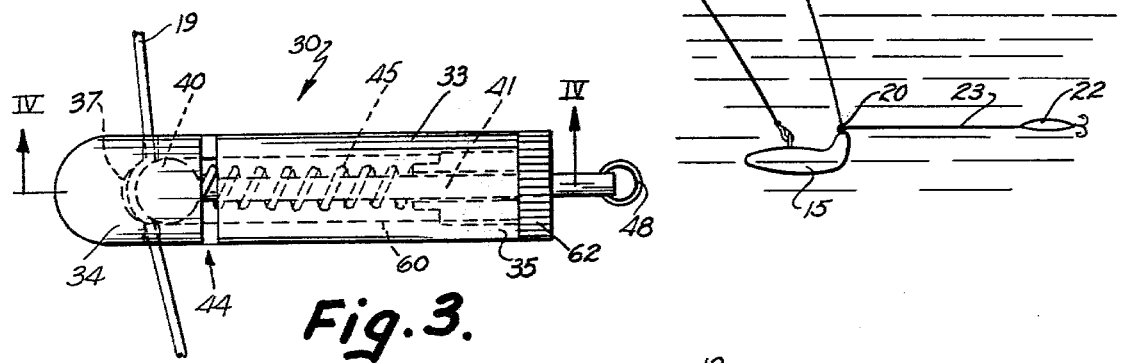
FIG. 3 is a top plan view of the multi-line fishing attachment of the present invention.
Figure 4:
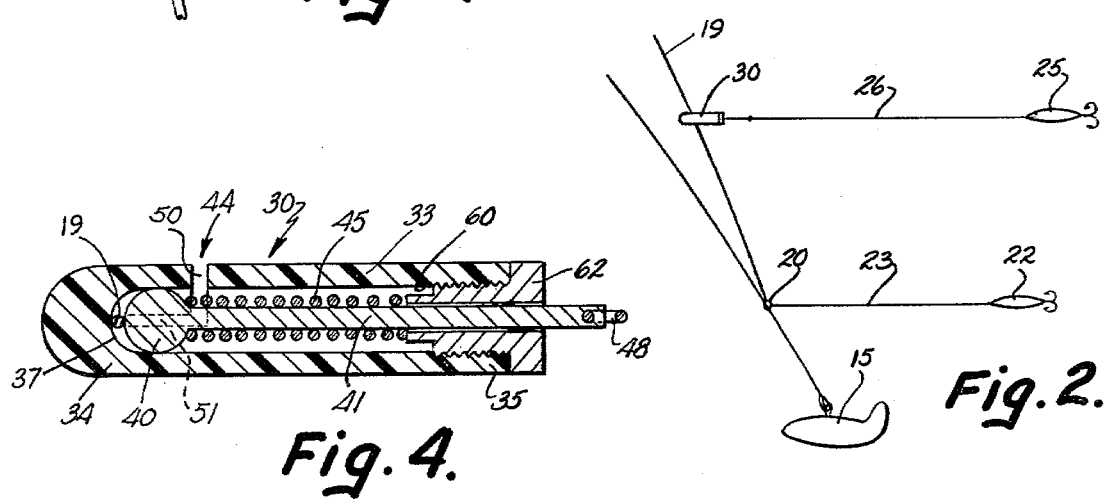
FIG. 4 is a sectional view of the multi-line fishing attachment of FIG. 3 taken along line IX—IX in FIG. 3.

Referring now to FIGS. 3 and 4, the multi-line fishing attachment 30 of the present invention is illustrated in further detail. The attachment 30 comprises an elongate, hollow, generally cylindrical body 33 including a proximate end 34 and a distal end 35. An abutment 37 is disposed in the proximate end 34 of the body 33. Preferably, the abutment 37 comprises a generally spherical socket. A movable clamping member comprising a generally spherical head 40 and stem 41 is disposed within the body and adapted for movement toward and away from the abutment 37. A guide means is provided for guiding the fishing line 19 between the abutment 37 and the head 40 of the clamping member. Preferably, the guide means comprises an L-shaped slot 44 disposed in the proximal end 34 of body 33. Spring biasing means comprising coil spring 45 is provided for urging the head 40 of the clamping member toward the abutment 37 into secure clamping engagement with the fishing line 19 disposed therebetween. Means for securing a leader to the stem 41 of the clamping member is provided comprising a ring 48. The pull of a fish on the leader connected to the ring 48 compresses coil spring 45, urging the head 40 of the clamping member away from the abutment 37 to allow relative movement between the body 30 and the fishing line 19 received therein.

The L-shaped slot 44 comprises a first radial component portion 50 and a second axial component portion 51. The axial component 50 of slot 44 is roughly aligned with the radial direction of elongate body 33 and the axial portion 51 of the slot 44 is roughly aligned with the axial direction of elongate body 33. The radial component portion 50 extends to roughly the center of the body 33 where it communicates with axial component 51. Axial component 51 extends toward the proximal end 34 of the body 30, terminating at the abutment 37.

Preferably, spring biasing means comprises coil spring 45 disposed about the stem 41 of the clamping member. The spring 45 is provided with a predetermined spring rate that may be overcome by the user to displace the head 40 of the clamping member away from the abutment 37 toward the distal end 35 of the body 33, an amount sufficient to allow the user to insert the fishing line 19 in radial component 50 of slot 44. Once the fishing line 19 is inserted in radial component 50 of slot 44, the clamping member is released, the head 40 of the clamping member urging the line 19 into the proximal end of axial component 51 of slot 44 to retain the same in clamping engagement between abutment 37 and head 40. This secures the attachment 30 to the fishing line 19 at any predetermined position along the fishing line. The predetermined spring rate of coil spring 45 is such that the spring is overcome by the drag of a fish taking the lure disposed on the leader attached to stem 41 of the clamping member. The drag of the fish resists and compresses coil spring 44 an amount sufficient to reduce the clamping force applied to line 19 and allow relative movement between the line 19 and the attachment 33. However, the spring rate of coil spring 45 is such that the drag of the fish cannot compress the spring sufficiently to allow accidental release of the fishing line 19 from L-shaped slot 44. A suitable spring rate for coil spring 45 has been found to be 0.0277 inch/lbs.

Preferably, the body 33 of the attachment 30 is of right circular cylindrical cross section with a streamlined, generally spherical proximal end 34. The body 33 of the attachment 30 includes an axial bore 60 which extends the length of the body 33, terminating at the abutment 37 in proximal end 34 of the body 33. The distal end 35 of the body 33 is open to provide an axial entrance to axially extending bore 60. The head 40 and stem 41 of the clamping member and coil spring 45 are axially insertable to axial bore 60 through the distal end 35 of the body 33. The body 33 preferably also includes a plug 62 threadably received in the axial opening of distal end 35 of the body 33. The stem 41 of the clamping member extends through the plug 62 and the coil spring 45 is compressed between the head 40 of the clamping member and the plug 62 when the plug 62 is seated in proximal end 35 of the body 33. Preferably, the body 33 is formed from a polymeric material with the slot 44 and axial bore 60 integrally formed therewith. The head 40 and stem 41 of the clamping member, as well as the plug 62, may be manufactured of a polymeric material or a metal such as brass. A suitable polymeric material for the body 33 is an acetal resin manufactured by Du Pont de Nemours, E. I. & 6. known by the trademark Delrin.

OPERATION

To use the multi-line fishing attachment of the present invention, the operator attaches a conventional single lure fishing line to a downrigger release and lowers the same into the water while the boat is trolling. When the first lure has been lowered to the point when the predetermined position for the second lure on fishing line 19 is within the reach of the user, the user simply clamps the attachment 30 to fishing line 19 by axially displacing the stem 41 of the clamping member and inserting the fishing line 19 within L-shaped slot 44. Once the stem of the clamping member is released, the line 19 is securely clamped within the attachment 30 at the predetermined position at which the second leader is desired. The second leader is attached to ring 48 on stem 41 of the clamping member and trails behind the fishing line 19 as the downrigger is lowered further into the water. The position of the attachment 30 along the line 19 may be varied by reeling in the downrigger a distance sufficient for the operator to again retract the clamping member and vary the position of the device 30 on line 19.

In the case of a fish strike on the first lure 22, the line release is actuated in a conventional fashion and the fish is played and reeled in until the device 30 breaks the surface of the water, at which time the second lure 25 and leader 26 are removed from line 19 by compressing the clamping member and removing the line 19 from L-shaped slot 44. The fish may then be played and reeled in, in the conventional manner.

In the case of a strike on the second lure 25, the drag of the fish compresses the clamping member an amount sufficient to reduce the clamping force on line 19, allowing the attachment 30 to be displaced on fishing line 19 toward the downrigger release 20. Upon reaching the downrigger release 20, the downrigger release is actuated by the drag of the fish. Further drag from the fish causes relative movement between the attachment 30 and the line 19 until the first lure 22 is reached. The first lure 22 then abuts axial component 51 of L-shaped slot 44 and then the fish on second lure 25 is reeled in and played in the conventional manner. Preferably, the leader 26 disposed on the attachment 30 is not so long as to prevent normal playing and reeling of the fish to the side of the boat since of course, the line 19 cannot be reeled in farther than the point at which the device 30 and the first lure 22 are secured thereto.

It should be obvious from the foregoing description of the preferred embodiment that the multi-line fishing attachment of the present invention is easily used to convert a single lure fishing rig back and forth from a multi-line fishing rig. Furthermore, the problems heretofore experienced with regard to improper downrigger release action have been obviated by the slip connecting action of the present fishing attachment, which provides for relative movement between the fishing line and the attachment when a strike occurs on the multiple leader.

The above description should be considered exemplary and that of the preferred embodiment only. The true scope and spirit of the present invention should be determined by reference to the appended claims. It is desired to include within the appended claims all modifications that come within the proper scope of the invention.

I claim:

1. A multi-line fishing attachment for slip connecting a leader to a fishing line comprising:
    a body for receiving a fishing line;
    an abutment carried by said body;
    a movable clamping member disposed on said body and adapted for movement toward and away from said abutment;
    a guide means for guiding a fishing line between said abutment and said clamping member;
    spring biasing means for urging said clamping member toward said abutment into secure clamping engagement with a fishing line clamped therebetween; and
    means for securing a leader to said clamping member whereby a fish strike urges said clamping member away from said abutment, out of secure clamping engagement therewith, to provide for relative movement between said body and a fishing line received thereby.

2. The multi-line fishing attachment of claim 1 wherein said abutment comprises a spherical socket and said clamping member includes a spherical head urged into said socket by said spring biasing means.

3. The multi-line fishing attachment of claim 2 wherein said clamping member further includes a stem extending from said spherical head and said spring biasing means comprises a coil spring disposed about said stem, said coil spring being compressed between said head and said body.

4. The multi-line fishing attachment of claim 3 wherein said body comprises an elongate hollow body having an axially extending bore for receiving said clamping member, head first.

5. The multi-line fishing attachment of claim 4 wherein said elongate body includes a proximal end and a distal end, said proximal end including said guide means for receiving a fishing line.

6. The multi-line fishing attachment of claim 5 wherein said socket is disposed on said proximal end of said body.

7. The multi-line fishing attachment of claim 6 wherein said distal end includes an axial entrance to said axially extending bore.

8. The multi-line fishing attachment of claim 7 wherein said body further includes a plug threadably received in said axial entrance to said axially extending bore, said stem of said clamping member extending through said plug and being slidably received therein, said coil spring being compressed between said head and said plug.

9. The multi-line fishing attachment of claim 8 wherein said guide means comprises an L-shaped slot disposed in the distal end of said body for receiving and centering a fishing line in said socket.

10. The multi-line fishing attachment of claim 9 wherein said body is generally cylindrical in shape and said proximal end is streamlined and generally spherical in shape.

11. The multi-line fishing attachment of claim 8 wherein at least one of said elongate hollow body, said clamping means and said plug are formed from a polymeric material.

12. The multi-line fishing attachment of claim 1 wherein said guide means comprises an L-shaped slot disposed in said body for receiving a fishing line.

13. The multi-line fishing attachment of claim 12 wherein said body comprises an elongate hollow member including an axial bore, a proximal end and a distal end, said proximal end including said guide means and said abutment, said clamping member being axially displaceable within said bore.

14. The multi-line fishing attachment of claim 13 wherein first and second, radial and axial component portions of said L-shaped slot are roughly radially and axially aligned, respectively, with said body.

15. The multi-line fishing attachment of claim 14 wherein said radial component portion extends to roughly the center of said body and said axial component portion extends toward said proximal end terminating at said abutment.

16. The multi-line fishing attachment of claim 15 wherein said spring biasing means is provided with a predetermined spring rate such that said spring biasing means may be overcome by the user to displace said clamping member away from said abutment, toward said distal end, a distance sufficient to provide for insertion of a fishing line in said L-shaped slot, said predetermined spring rate being sufficient to maintain said clamping member in the region of said axial component portion of said L-shaped slot to insure that a fishing line is not released during a fish strike.

17. The multi-line fishing attachment of claim 13 wherein said clamping member comprises a head for engaging a fishing line and a stem extending through said distal end of said body, said means for securing a leader being disposed on said stem exterior of said distal end of said body.

18. The multi-line fishing attachment of claim 17 wherein said spring biasing means comprises a coil spring disposed about said stem and compressed between said head and said body.

19. The multi-line fishing attachment of claim 18 wherein said body further includes a plug threadably received in said distal end of said body, said stem extending therethrough and said coil spring being seated on said plug.

20. A multi-line fishing attachment for slip connecting a leader to a fishing line comprising:
   a hollow elongate generally cylindrical body for receiving a fishing line;
   said body including axially opposed proximate and distal ends;
   an abutment formed in said body, said abutment being disposed on said proximal end of said body;
   an axially displaceable clamping member disposed within said body and adapted for movement toward and away from said abutment;
   a guide means formed in said proximal end of said body for guiding a fishing line between said abutment and said clamping member;
   a spring biasing means for urging said clamping member toward said abutment into secure clamping engagement with a fishing line clamped therebetween;
   a stem disposed on said clamping member said stem extending through said distal end of said body; and
   means for securing a leader to said stem whereby a fish strike urges said clamping member away from said abutment, out of secure clamping engagement therewith, to provide for relative movement between said body and a fishing line received thereby.

* * * * *